United States Patent [19]

Pitts et al.

[11] Patent Number: 5,223,352
[45] Date of Patent: Jun. 29, 1993

[54] LEAD-ACID BATTERY WITH DIMENSIONALLY ISOTROPIC GRAPHITE ADDITIVE IN ACTIVE MATERIAL

[75] Inventors: Rudolph V. Pitts, P.O. Box 462, Fayetteville, Tenn. 37334; John B. Williamson, Fayetteville, Tenn.; Michael J. Gough, Rogersville, Ala.; Thomas E. Bolner, Fayetteville, Tenn.

[73] Assignee: Rudolph V. Pitts, Fayetteville, Tenn.

[21] Appl. No.: 818,688

[22] Filed: Jan. 7, 1992

[51] Int. Cl.$^5$ .............................................. H01M 4/62
[52] U.S. Cl. ..................................... 429/225; 429/232
[58] Field of Search ................................ 429/225, 232

[56] References Cited

U.S. PATENT DOCUMENTS

| | | | |
|---|---|---|---|
| 3,751,301 | 8/1973 | Kilduff | 429/232 X |
| 4,331,744 | 5/1982 | Henk et al. | 429/225 X |
| 4,358,390 | 11/1982 | Coulombeau et al. | 429/232 X |
| 4,400,449 | 8/1983 | Henk | 429/59 |

Primary Examiner—Stephen Kalafut
Attorney, Agent, or Firm—Bruce L. Lamb

[57] ABSTRACT

A lead-acid battery in which the plates are fabricated from a paste containing principally lead oxide and a small amount of dimensionally isotropic graphite fiber of a specific type. The specific type of graphite fiber may be either a graphite fiber synthesized from a polyacrylonitrile (PAN) precursor or a graphite fiber synthesized from a pitch precursor.

20 Claims, 1 Drawing Sheet

LEAD-ACID BATTERY WITH DIMENSIONALLY ISOTROPIC GRAPHITE ADDITIVE IN ACTIVE MATERIAL

The present invention relates to lead-acid storage batteries. More particularly, it relates to lead-acid batteries in which dimensionally isotropic graphite is added to the active material from which the plates of the battery are formed.

BACKGROUND OF THE INVENTION

Lead-acid storage batteries are produced in a variety of forms, with the differences in form being largely the result of compromises made between such factors as cost, weight, volume, capacity and service life. All lead-acid storage batteries have the common features of a positive plate in which the active material is lead dioxide, a negative plate composed of lead, and a water-sulfuric acid electrolyte.

In the manufacture of lead-acid batteries of the type in widest use, the positive plates are prepared from lead alloy grids filled with a paste principally containing lead oxide. The negative plates may also be prepared from lead grids filled with a paste similar to the positive paste. After the pasted plates are cured, the positive plates and the negative plates are assembled as cells in a battery case, the battery case is filled with electrolyte and the battery is subjected to a formation process. In the formation process, a charging potential is applied to the battery for a period of time to convert the lead oxide compounds of the positive plates to lead dioxide, the positive active material of the battery, and, if the negative plates are of the pasted type, to covert the lead oxide compounds of the negative plates to sponge lead, the negative active material of the battery. The cost of the energy required to perform the formation process is a significant part of the total cost of battery manufacture.

Various additives have been included in the lead oxide paste formulations in efforts to improve battery performance and life. To combat the tendency of the negative plate to contract in service, a small amount of "expander" such as lampblack or barium sulfate may be added to the negative paste.

U.S. Pat. No. 1,788,571, issued Feb. 2, 1927, for "Active Material for Storage Batteries" discloses a lead-acid battery in which the composition of the active material for the positive plate comprises about 100 pounds of lead dioxide, about 100 pounds of lead monoxide, about 4 pounds of tantalum oxide, about 2 pounds of molybdenum oxide and about 1 pound of powdered carbon. The tantalum oxide serves to absorb hydrogen and to strengthen the plate. No purpose for including powdered carbon in the composition is stated.

U.S. Pat. No. 4,631,241, issued Dec. 23, 1986, for "Retainer Type Lead-Acid Battery" discloses a battery in which the electrolyte is retained in a glass fiber mat. The opposed surfaces of the retainer mat must maintain intimate contact with the surfaces of the positive and negative plates for the battery for the full discharge capacity of the battery to be realized. To achieve such contact, the positive active material is composed of lead powder blended with anisotropic graphite powder in an amount of at least 0.1% of the weight of the lead powder. Upon formation of the battery, the graphite is said to oxidize to form an intercalation compound between graphite and acidic sulfate salt. This reaction causes the graphite to expand, thereby increasing the porosity of the plate and urging the plate into intimate contact with the electrolyte retainer mat.

U.S. Pat. No. 4,735,870, issued Apr. 5, 1988, for "Lead-Acid Battery Construction" discusses the process occurring during discharge of a lead-acid battery in which the lead dioxide of the positive active material, a fairly good conductor, is converted to lead sulfate, an insulator. The lead sulfate encapsulates the lead dioxide particles, limiting utilization to less than 50% of capacity, typically around 30%. Attempts to increase the conductivity of the positive paste by adding a conductive filler, such as graphite, are mentioned. However, it is concluded that graphite is not an effective additive for conductance enhancement in a lead-acid battery because the graphite is oxidized to acetic acid which combines with the lead ion, causing corrosion of the positive grid. The positive paste additive described and claimed in the '870 patent is tin dioxide dispersed in the paste as a powder or coated on a substrate for dispersion in the paste.

It is an object of the present invention to provide an additive for the paste from which the positive plate of a lead-acid battery is formed that will enhance the conductivity of the positive plate and thereby improve the performance of the battery.

Another object of the invention is to provide an additive for the paste from which the negative plate of a lead-acid battery is formed that will enhance the conductivity of the negative plate and thereby improve the performance of the battery, particularly during operation at low temperatures.

Another object of the invention is to provide a lead-acid battery in which the energy required for formation is substantially reduced from that required for formation of a conventional lead-acid battery of comparable capacity.

It is a further object of the invention to provide a lead-acid battery in which the amount of the theoretical capacity of the battery available for utilization is substantially increased over the capacity obtainable from prior lead-acid batteries.

Still another object of the invention is to provide a lead-acid battery having a reduced internal resistance as compared with a conventional lead-acid battery of similar size, weight and capacity.

Additional objects of the invention are to provide a lead-acid battery that may be rapidly recharged, that produces greater output for cold cranking loads, and that recovers rapidly after being highly discharged.

Other objects and advantages of the invention will become apparent as a fuller understanding of the invention is gained from the detailed description to follow.

SUMMARY OF THE INVENTION

Briefly, the present invention comprises a lead-acid battery in which the positive plates are prepared by filling a lead alloy grid with a lead oxide paste containing a relatively small amount of a specific type of synthetic graphite additive. If the negative plates are of the pasted type, the negative plates are prepared similarly to the positive plates by filling a lead alloy grid with a lead oxide paste also containing a relatively small amount of a specific type of synthetic graphite additive. The pasted grids for the positive and negative plates are cured, assembled as cells in a battery case containing electrolyte, as is conventional, and formed by charging in the usual manner. The graphite additive for both the positive paste and the negative paste is a fibrous form of either a synthetic graphite processed from a polyacrylonitrile (PAN) precursor or a synthetic graphite processed from a pitch precursor. If a "PAN" type of graphite fiber is used as the additive, the fibers are preferably comminuted or fractured prior to inclusion in the paste.

DETAILED DESCRIPTION OF THE INVENTION

Figure 1:
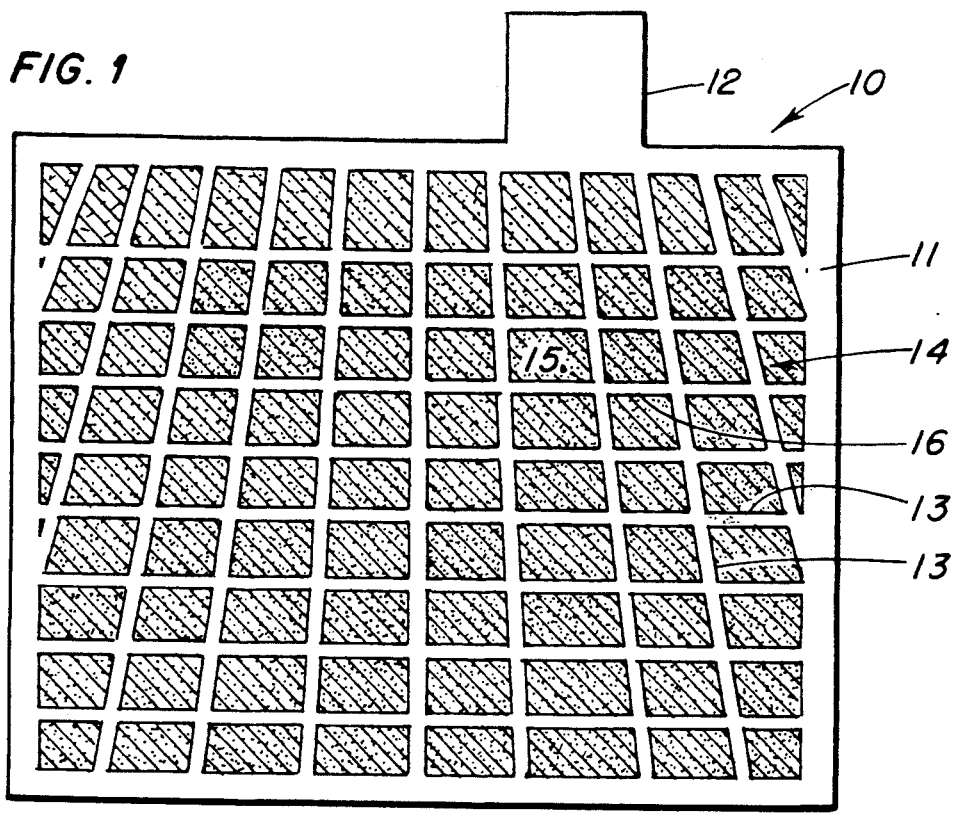
FIG. 1 is an elevation of a pasted plate, which may be either a positive plate or a negative plate, made according to the invention.

FIG. 1 illustrates a pasted plate for a lead-acid battery made in accordance with the invention. A lead-antimony alloy gird 10 of typical form comprises a peripheral frame 11 having a terminal 12 extending outwardly therefrom. A plurality of intersecting rails 13 are distributed generally horizontally and vertically within the area enclosed by frame 11 to create a planar, mesh-like matrix, the interstices 14 of which are open to both surfaces. The interstices of the grid are tightly filled with a paste 15 composed principally of lead oxide to which fibers 16 of either a PAN synthetic graphite or a pitch synthetic graphite have been added. The paste 15 for a positive plate may also contain a small amount of Dynel fibers. The paste 15 for a negative plate may contain a small amount of expander, such as carbon black.

The Dynel fibers are chemically and electrically inert and serve only to strengthen the resultant plate. The graphite fibers are highly electrically conductive but are chemically inert and remain dimensionally stable in the battery environment. Analysis of the electrolyte taken from a cell made according to the invention that was repeatedly overcharged and discharged showed the acetic acid content of the electrolyte to be less than 1 part per million.

The dimensions of the graphite fibers used in the invention do not change when the pasted plates are exposed to the battery electrolyte. In that sense the selected forms of graphite fibers are isotropic, as opposed to anisotropic forms of graphite which undergo a dimensional change when exposed to the electrolyte of the battery.

The graphite fibers are uniformly distributed through the paste to provide low resistance paths for the flow of electrons between the active material of the plates and the gird. These low resistance paths reduce the internal resistance of the battery by circumventing the higher resistance granules of lead compounds in the plate. The high resistance granules are usually agglomerations of lead sulfate crystals, both at the positive and at the negative plates. Under low temperature and high discharge rate conditions additional impeding factors arise.

The standard for rating battery performance is defined in Society of Automotive Engineers Standard SAE-J-537, June 1986. This standard calls for measuring the battery output under specified conditions while the battery is at a temperature of 0° F. At such temperature the water that is produced by the electrode reaction may freeze, generating ice crystals to cause an increase in the internal resistance of the battery. Also, at high discharge rates the electrode reaction is concentrated at the surface of the plates, restricting conduction to the interior of the plates. The graphite additive of the invention not only increases conduction between the active materials of the plates and the plate grids but it also increases conduction within the active materials of the plates and from the surfaces of the plates to the interiors. The increased performance of a battery made according to the invention over that of a conventional battery of comparable theoretical capacity is particularly noticeable under low temperature, high discharge rate conditions.

Figure 2:
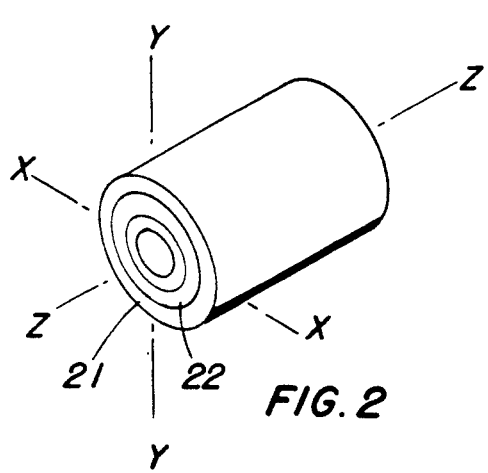
FIG. 2 is an isometric view of a PAN graphite fiber showing the internal structure thereof.
Figure 2A:
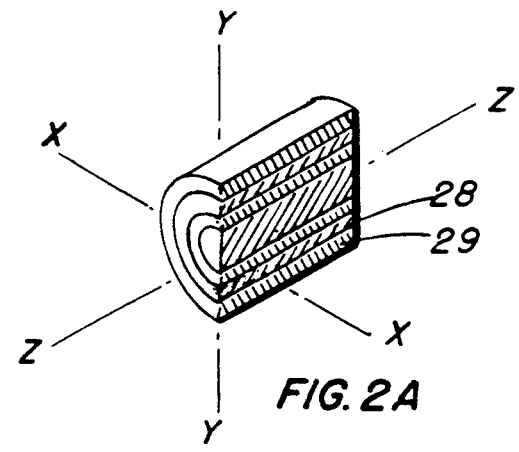
FIG. 2A is an isometric view of the fiber of FIG. 2 after comminution of the fiber.
Figure 3:
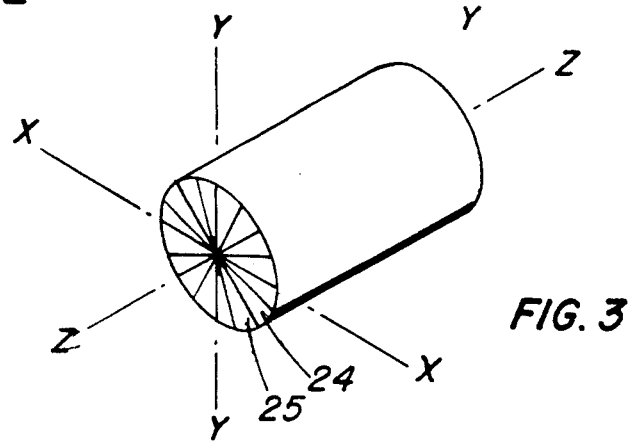
FIG. 3 is an isometric view of a pitch graphite fiber showing the internal structure thereof.

Referring to FIGS. 2 and 3, differences in the precursors from which polyacrylonitrile (PAN) precursor graphite fibers and pitch precursor graphite fibers are manufactured lead to different spatial arrangements of the graphite crystals. As seen in FIG. 2, the crystal planes of a PAN graphite fiber are arranged in sheets of contiguous, concentric cylinders 21, 22 running axially along the length of the fiber. As seen in FIG. 3, the crystal planes of a pitch graphite fiber extend radially outward from the fiber axis in sheets 24, 25 of wedge shaped cross section. These differences in structure between PAN and pitch graphite fibers result in differences in the electrical conductivities of the respective types of fibers according to the direction in which current flows through the fiber. The conductivity of pitch graphite fiber is high for current flowing axially through the fiber, in the direction of the Z axis of FIG. 3, and for current flowing transversely across the fiber, in the plane of the X-Y axes of FIG. 3. Little variation of the conductivity with the direction of current flow is seen in pitch graphite fibers.

The conductivity of PAN graphite fiber is high for current flowing axially through the fiber, in the direction of the Z axis of FIG. 2. The conductivity of the fiber for current flowing transversely across the fiber, in the plane of the X-Y axes of FIG. 2, is substantially lower than that for axially flowing current. It has been found that by fracturing or comminuting the PAN fiber to expose axially extending edges 28, 29 of the crystal sheets, the conductivity of the fiber for transverse currents is made substantially equal to the high conductivity of the fiber for axial currents. Therefore, if a PAN graphite fiber is selected as the positive paste additive in accordance with the invention, the fibers are not only chopped to suitable lengths but, preferably, they are comminuted as well before being incorporated in the paste. Pitch graphite fibers need only be chopped to suitable lengths before being incorporated in the paste.

Specific formulations for positive and negative pastes of the invention are given in Formula I and Formula II, below. The paste ingredients are stated in percent by weight.

| Formula I - Positive Paste | |
|---|---|
| Lead Oxide | 81.3% |
| Sulfuric Acid (1.35 s.g.) | 9.5% |
| Deionized Water | 8.7% |
| Dynel Fiber | 0.1% |
| PAN Graphite Fiber (chopped & comminuted) | 0.4%* |
| Formula II - Negative Paste | |
| Lead Oxide | 82.0% |

| -continued | |
|---|---|
| Sulfuric Acid (1.35 s.g.) | 8.2% |
| Deionized Water | 8.8% |
| Barium Sulfate | 0.2% |
| Carbon Black | 0.2% |
| Ligno-sulfonic Acid | 0.2% |
| PAN Graphite Fiber (chopped & comminuted) | 0.4%* |

*Pitch graphite fiber (chopped) may be substituted.

The graphite fibers preferably average about 3.0 mm. in length, by about 0.005 mm in diameter, although other sizes may be employed. The proportion of the graphite fiber additive to lead oxide may be varied between 0.1% and 0.5%, and the proportion of deionized water in the paste mix may be varied to achieve the consistency most satisfactory for application to the plate grid. In the preparation of the paste, it is important that the sulfuric acid be added slowly to the mix to prevent burning the lead oxide.

The plate grid is filled with the paste which is then compacted to eliminate voids in the paste and to ensure intimate contact between the paste and the grid members. The pasted plates are cured, normally for about 72 hours, and then assembled as cells in a battery case in the conventional manner. After assembly, the battery is filled with water-sulfuric acid electrolyte and subjected to a formation process to convert the lead oxide of the positive paste to lead dioxide, the positive active material and the lead oxide of the negative paste to sponge lead, the negative active material.

In the formation of a battery made with a positive paste according to the invention, an initial charging current of 2.0 amps. was applied for 50 hours, followed by a charging current of 1.0 amp. for 1.25 hours, and then finished with a charging current of 0.5 amps. for 50.25 hours. Assuming that the mean voltage applied to the battery during formation was 13.0 volts, the energy required for formation was approximately 1643 watt-hours. The energy required for formation of a conventional battery of comparable capacity was 4212 watt-hours. Thus, the energy needed for formation of a battery of the invention amounted to only 39% of the energy needed for formation of a conventional battery of the same capacity.

PAN graphite fibers suitable for use in the invention are available from Hercules, Inc., Wilmington, Del., as AS-4 PAN graphite fiber.

Pitch graphite fibers suitable for use herein are available from Mitsubishi Kasei America, Inc., Menlo Park, Calif. as chopped K-223 Pitch graphite fiber.

Variations in the invention are possible in the light of the above teachings. The invention may be practiced otherwise than as specifically disclosed without departing from the spirit and scope of the appended claims.

The invention claimed is:

1. A positive plate for a lead-acid battery comprising:
   a lead alloy grid;
   a positive active material composed principally of lead dioxide supported by said grid; and
   a plurality of dimensionally isotropic, synthetic graphite fibers dispersed uniformly through said positive active material in an amount of from about 0.1 to about 0.5 percent of the weight of said positive active material.

2. A plate as claimed in claim 1 wherein said graphite fibers comprise fibers synthesized from a polyacrylonitrile (PAN) precursor.

3. A plate as claimed in claim 1 wherein said graphite fibers comprise fibers synthesized from a pitch precursor.

4. A plate as claimed in claim 1 wherein said graphite fibers are generally cylindrical in form of a length of from about 1.0 mm. to about 5.0 mm. and of a diameter from about 0.005 mm. to about 0.01 mm. in diameter.

5. A plate as claimed in claim 2 wherein said graphite fibers are comminuted to expose axial sections of said fibers.

6. A negative plate for a lead-acid battery comprising:
   a lead alloy grid;
   a negative active material composed principally of sponge lead supported by said grid; and
   a plurality of dimensionally isotropic, synthetic graphite fibers dispersed uniformly through said negative active material in an amount of from about 0.1 to about 0.5 percent of the weight of said negative active material.

7. A plate as claimed in claim 6 wherein said graphite fibers comprise fibers synthesized from a polyacrylonitrile (PAN) precursor.

8. A plate as claimed in claim 6 wherein said graphite fibers comprise fibers synthesized from a pitch precursor.

9. A plate as claimed in claim 6 wherein said graphite fibers are generally cylindrical in form of a length of from about 1.0 mm. to about 5.0 mm. and of a diameter from about 0.005 mm. to about 0.01 mm. in diameter.

10. A plate as claimed in claim 7 wherein said graphite fibers are comminuted to expose axial sections of said fibers.

11. A paste for preparing a positive plate for a lead-acid battery, comprising:
    a mixture of lead oxide, sulfuric acid, deionized water, Dynel fibers and dimensionally isotropic, synthetic graphite fibers;
    said lead oxide being in a proportion of about 80 percent of the weight of said mixture;
    said Dynel fibers being in a proportion of about 0.1 percent of the weight of said mixture;
    said graphite fibers being in a proportion of from about 0.1 percent to about 0.5 percent of the weight of said mixture;
    the balance of said mixture being made up of about equal parts of said sulfuric acid and said deionized water.

12. A paste as claimed in claim 11 wherein said graphite fibers comprise fibers synthesized from a polyacrylonitrile (PAN) precursor.

13. A paste as claimed in claim 11 wherein said graphite fibers comprise fibers synthesized from a pitch precursor.

14. A paste as claimed in claim 11 wherein said graphite fibers are generally cylindrical in form of a length of from about 1.0 mm. to about 5.0 mm. and of a diameter from about 0.005 mm. to about 0.01 mm. in diameter.

15. A paste as claimed in claim 12 wherein said graphite fibers are comminuted to expose axial sections of said fibers.

16. A paste for preparing a negative plate for a lead-acid battery, comprising:
    a mixture of lead oxide, sulfuric acid, deionized water, barium sulfate, carbon black, ligno-sulfonic acid and dimensionally isotropic, synthetic graphite fibers;

said lead oxide being in a proportion of about 80 percent of the weight of said mixture;

said barium sulfate being in a proportion of about 0.2 percent of the weight of said mixture;

said carbon black being in a proportion of about 0.2 percent of the weight of said mixture;

said ligno-sulfonic acid being in a proportion of about 0.2 percent of the weight of said mixture;

said graphite fibers being in a proportion of from about 0.1 percent to about 0.5 percent of the weight of said mixture;

the balance of said mixture being made up of about equal parts of said sulfuric acid and said deionized water.

17. A paste as claimed in claim 16 wherein said graphite fibers comprise fibers synthesized from a polyacrylonitrile (PAN) precursor.

18. A paste as claimed in claim 16 wherein said graphite fibers comprise fibers synthesized from a pitch precursor.

19. A paste as claimed in claim 16 wherein said graphite fibers are generally cylindrical in form of a length of from about 1.0 mm. to about 5.0 mm. and of a diameter from about 0.005 mm. to about 0.01 mm. in diameter.

20. A paste as claimed in claim 17 wherein said graphite fibers are comminuted to expose axial sections of said fibers.

* * * * *